(12) United States Patent
Nadbath et al.

(10) Patent No.: US 8,607,202 B2
(45) Date of Patent: Dec. 10, 2013

(54) REAL-TIME PROFILING IN A MULTI-CORE ARCHITECTURE

(75) Inventors: Guenther Nadbath, Vienna (AT); Eyal Rosin, Rosh Ha'ayin (IL); Assaf Rachlevski, Modiin (IL)

(73) Assignee: LSI Corporation, San Jose, CA (US)

( * ) Notice: Subject to any disclaimer, the term of this patent is extended or adjusted under 35 U.S.C. 154(b) by 735 days.

(21) Appl. No.: 12/793,839

(22) Filed: Jun. 4, 2010

(65) Prior Publication Data
US 2011/0302560 A1    Dec. 8, 2011

(51) Int. Cl.
*G06F 9/44*    (2006.01)
*G06F 9/45*    (2006.01)

(52) U.S. Cl.
USPC .................. 717/130; 717/128; 717/158

(58) Field of Classification Search
None
See application file for complete search history.

(56) References Cited

U.S. PATENT DOCUMENTS

| | | | |
|---|---|---|---|
| 5,896,538 A * | 4/1999 | Blandy et al. | 717/130 |
| 6,898,657 B2 * | 5/2005 | Smith | 710/305 |
| 6,973,591 B2 * | 12/2005 | Debling | 714/30 |
| 7,007,201 B1 | 2/2006 | Byrne et al. | 714/27 |
| 7,013,456 B1 * | 3/2006 | Van Dyke et al. | 717/128 |
| 7,058,855 B2 | 6/2006 | Rohfleisch et al. | 714/28 |
| 7,305,663 B1 * | 12/2007 | McGuire et al. | 717/128 |
| 7,685,588 B2 * | 3/2010 | Zheltov et al. | 717/158 |
| 7,698,692 B1 * | 4/2010 | Garud et al. | 717/130 |
| 7,890,941 B1 * | 2/2011 | Garud et al. | 717/158 |
| 7,962,314 B2 * | 6/2011 | Chernoff | 717/130 |
| 8,024,708 B2 * | 9/2011 | Demetriou et al. | 717/124 |
| 2001/0032305 A1 | 10/2001 | Barry | 712/34 |
| 2006/0136878 A1 * | 6/2006 | Raghunath et al. | 717/130 |
| 2008/0115113 A1 | 5/2008 | Codrescu et al. | 717/127 |
| 2008/0115115 A1 | 5/2008 | Codrescu et al. | 717/128 |
| 2010/0251223 A1 * | 9/2010 | Gordy et al. | 717/136 |
| 2012/0022832 A1 * | 1/2012 | Shannon et al. | 702/189 |
| 2012/0185864 A1 * | 7/2012 | Toukmaji et al. | 718/104 |

OTHER PUBLICATIONS

William Orme, "Debug and Trace for Multicore SoCs", Sep. 2008, ARM Limited, pp. 1-6; <http://www.arm.com/files/pdf/CoresightWhitepaper.pdf>.*

Daniel Pereira Nunes, "A Profiler for a Heterogeneous Multi-Core Multi-FPGA System", 2008, University of Toronto, pp. 1-53; <http://www.eecg.toronto.edu/~pc/research/publications/nunes.thesis08.pdf>.*

Zhao et al., "PiPA: Pipelined Profiling and Analysis on Multi-core Systems", 2008 ACM, CGO'08, Apr. 5-10, 2008, Boston, Massachusetts, USA, pp. 185-194; <http://dl.acm.org/citation.cfm?doid=1356058.1356083>.*

(Continued)

*Primary Examiner* — Thuy Dao
*Assistant Examiner* — Ben C Wang
(74) *Attorney, Agent, or Firm* — Christopher P. Maiorana, P.C.

(57) ABSTRACT

An apparatus comprising a first core of a multi-core processor, a second core of a multi-core processor and a bus matrix. The first core may be configured to communicate through a first input/output port. The first core may also be configured to initiate a testing application. The second core may be configured to communicate through a second input/output port. The second core may also be configured to respond to the testing application. The bus matrix may be connected to the first input/output port and the second input/output port. The bus matrix may transfer data between the first core and the second core. The testing application may generate real-time statistics related to the execution of instructions by the second core.

16 Claims, 4 Drawing Sheets

(56) References Cited

OTHER PUBLICATIONS

Das et al., "Experiences of Using a Dependence Profiler to Assist Parallelization for Multi-cores", 2011 IEEE, pp. 1-8; <http://ieeexplore.ieee.org/stamp/stamp.jsp?tp=&arnumber=5470884>.*

Orme, William, "Debug and Trace for Multicore SoCs", Sep. 2008, pp. 1-6.

Leatherman, Rick, "Nonintrusive Visibility Into Multicore SOCs", Nov. 13, 2009, pp. 1-2.

Braunes, Jens, "Multi-Core—A New Challenge for Debugging", Oct. 14, 2008, pp. 1-5.

* cited by examiner

REAL-TIME PROFILING IN A MULTI-CORE ARCHITECTURE

FIELD OF THE INVENTION

The present invention relates to profiling generally and, more particularly, to a method and/or apparatus for implementing real-time profiling in a multi-core architecture.

BACKGROUND OF THE INVENTION

Conventional real-time profiling solutions, such as Nexus and ETM, involve adding large FIFO buffers and/or logic to compress trace data in order overcome data rate issues. Many applications for a digital signal processor (DSP) use a specific environment of input/output data and data execution timing for running in real-time. Conventional profiling approaches do not allow profiling of such applications in real-time.

Profiling is a method to generate run-time statistics for each procedure in an application. For example, profiling methods are used to evaluate how long a computer code process takes to execute. Profiling methods are also used to determine memory allocation requirements. Based on the profiling statistics, the application execution speed of a DSP can be optimized.

Profiling uses instruction trace data along with a cycle counter to calculate the execution statistics. A profiler can identify processor bottlenecks and provide clues for optimization options. A profiler provides insight into the operation of a system by monitoring CPU clock cycles. In conventional DSP chips, instruction trace data is collected in an on-chip trace buffer. If the trace buffer is full, a debugger running on a host PC stops execution of the application, outputs the trace data, and empties the trace buffer. Afterwards, application execution is resumed. The debugger calculates the profile statistics based on the gathered trace data. Such an approach frequently stops execution and therefore does not work for real-time applications, such as media gateways and base bands.

It would be desirable to implement a system and/or circuit that provides real-time profiling for data execution timing and/or bandwidth issues while minimizing logic added to a DSP chip.

SUMMARY OF THE INVENTION

The present invention concerns an apparatus comprising a first core of a multi-core processor, a second core of a multi-core processor and a bus matrix. The first core may be configured to communicate through a first input/output port. The first core may also be configured to initiate a testing application. The second core may be configured to communicate through a second input/output port. The second core may also be configured to respond to the testing application. The bus matrix may be connected to the first input/output port and the second input/output port. The bus matrix may transfer data between the first core and the second core. The testing application may generate real-time statistics related to the execution of instructions by the second core.

The objects, features and advantages of the present invention include providing real-time profiling that may be (i) implemented in real-time, (ii) implemented in a multi-core architecture, (iii) implemented without additional external hardware, (iv) used to minimize logic added to a DSP chip, (v) implemented in a combined hardware and software solution and/or (vi) implemented on-chip.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
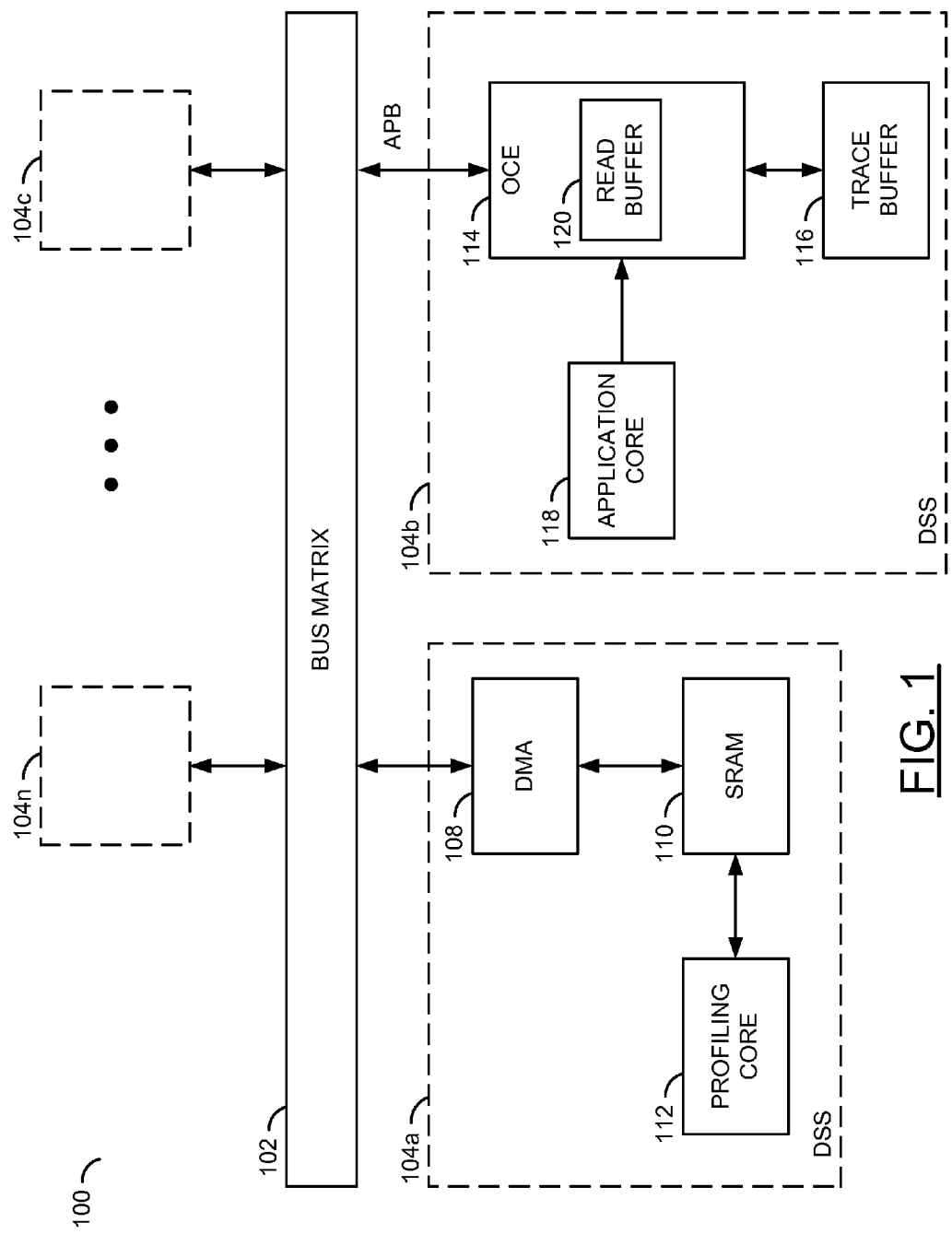
FIG. 1 is a block diagram of a circuit 100 in accordance with the present invention.

Referring to FIG. 1, a block diagram of a block (or circuit) 100 is shown in accordance with the present invention. In one example, the circuit 100 may be implemented as a processor. In another example, the circuit 100 may be implemented as a multi-core processor. The circuit 100 generally comprises a block 102 and a plurality of blocks (or circuits) 104a-104n. The circuit 102 may be implemented as a bus matrix. The bus matrix 102 may be considered a global bus that connects each of the cores 104a-104n. The circuits 104a-104n generally represent individual cores and/or peripherals of the multi-core circuit 100. The circuits 104a-104n may be implemented as DSP subsystem (DSS) circuits. One or more of the circuits 104a-104n may be implemented as an interactive software-based system to compile data that may be used to identify and/or solve problems related to operating the circuit 100. The particular number of cores 104a-104n may be varied to meet the design criteria of a particular implementation.

In one example, the circuit 104a may be configured to host a profiling software application. The circuit 104a generally comprises a block (or circuit) 108, a block (or circuit) 110, and a block (or circuit) 112. The circuit 108 may be implemented as a direct memory access (DMA) circuit. The circuit 110 may be implemented as a static random access memory (SRAM) circuit. The circuit 112 may be implemented as a profiling core circuit. For example, the circuit 112 may execute a set of instructions to implement a profiling application.

In one example, the circuit 104b may be configured as a core that responds to the profiling tests and/or profiling application. The circuit 104b generally comprises a block (or circuit) 114, a block (or circuit) 116, and a block (or circuit) 118. The circuit 114 may be implemented as an on-chip emulation (OCE) circuit. The circuit 116 may be implemented as a trace buffer circuit. The circuit 118 may be implemented as an application core circuit. The circuit 114 may include a block (or circuit) 120. The circuit 120 may be implemented as a read buffer. However, more than one read buffer may be implemented.

Profiling in real-time may be implemented based on the calculation of one or more profile statistics generated using the profiling core 112. The profiling core 112 may receive trace data in real-time through the bus matrix 102 from the application core 118 running an application. The trace data (or trace) may be a stream of recorded events. The trace data may be collected by the profiling core 112. The trace data may then be processed to generate profile statistics in real-time without interrupting the application core 118. The profile statistics may be transferred from the profiling core 112 to a debugger (to be described in more detail in connection with FIG. 4).

The profiling core 112 may allow profiling in real-time when in a first mode (e.g., a profiling mode). The profiling core 112 may be used as a regular application core when in a second mode (e.g., a non-profiling mode). In one example, trace data may be generated by more than one of the cores 104a-104n. In such an example, profiling statistics from one of the cores (e.g., the core 104c) may be compared to profiling statistics from another of the cores (e.g., the core 104b). By comparing statistics between several of the cores 104a-104n, debugging of the circuit 100 may be implemented.

The circuit 100 provides several features when implementing profiling. For example, profiling statistics may be calculated on-chip in real-time using one of the cores (e.g., the core 104a) of the multi-core processor 100. Profiling may be accomplished in a production environment without any additional off-chip hardware. Since one of the cores (e.g., the core 104a) is used to test another of the cores (e.g., the core 104b), no off-chip traces and/or accesses are needed. On-chip interconnections through the bus matrix 102 may be implemented to transfer trace data and/or other data between the cores 104a-104n. The circuit 100 may combine a hardware and software solution to provide profiling. For example, a hardware path may be used to transfer trace data between the profiling core 112 and the application core 118. Software running on the profiling core 112 may be used for real-time calculation of profile statistics.

The core circuit 112 and the core circuit 118 may support local memory for data and instructions. The core circuit 112 and the core circuit 118 may present trace data to the bus 102. The trace data may contain change of instruction flow data consisting of source addresses, target addresses, and/or cycle counters.

Figure 2:
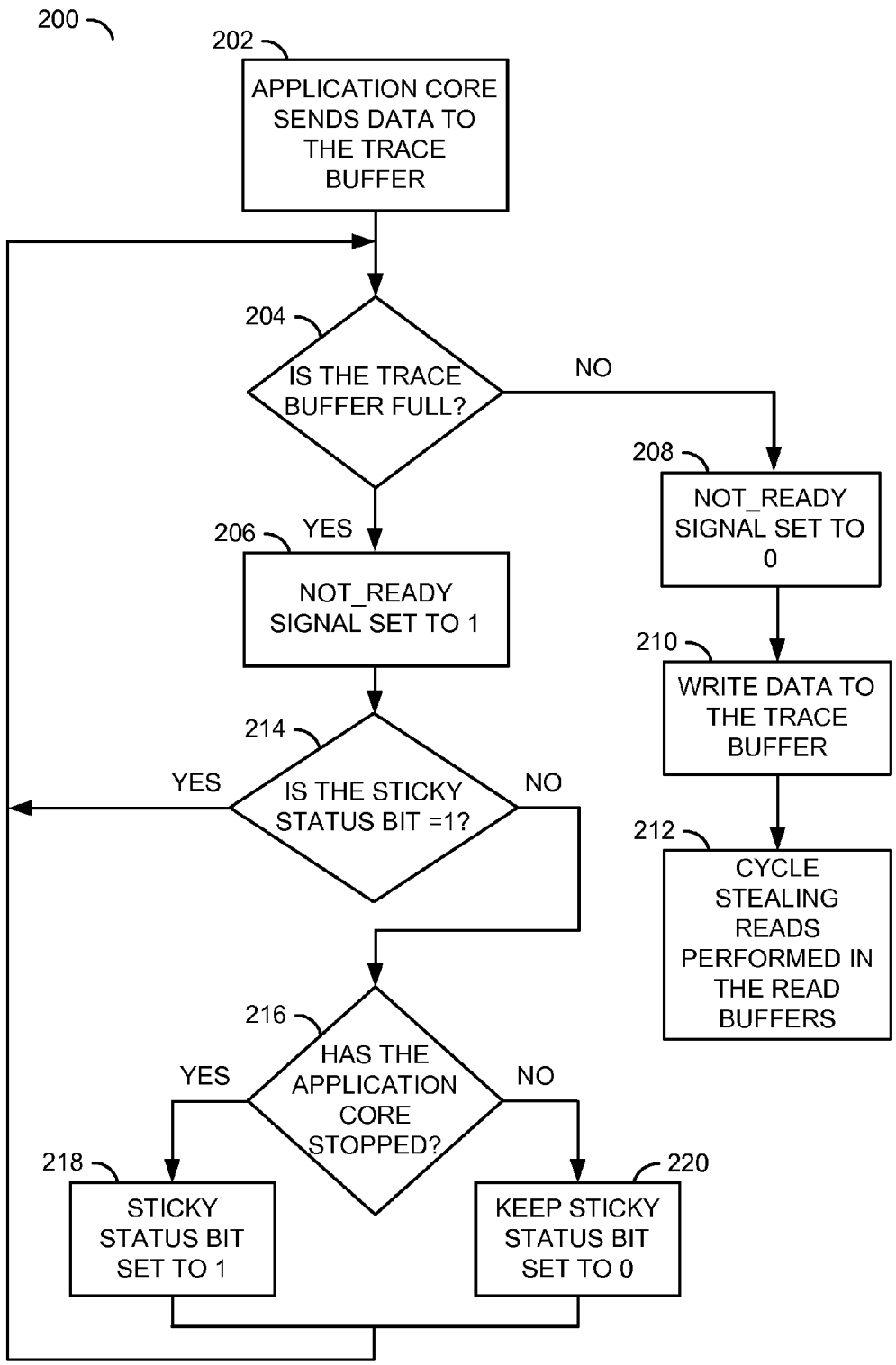
FIG. 2 is a flow chart of the process for writing data to the trace buffer.

Referring to FIG. 2, a flow chart of a method (or process) 200 for writing data from the application core 118 to the trace buffer 116 is shown. The process generally comprises a step (or state) 202, a decision step (or state) 204, a step (or state) 206, a step (or state) 208, a step (or state) 210, a step (or state) 212, a decision step (or state) 214, a decision step (or state) 216, a step (or state) 218 and a step (or state) 220. The state 202 starts the process 200 by having the application core 118 send data to the trace buffer 116. The decision state 204 may determine if the trace buffer 116 is full. If not, the method 200 moves to the state 208. The state 208 may then set a not_ready signal to a digital zero. Next, the state 210 may write data to the trace buffer 116. Next, the state 212 may implement cycle steal reads into the read buffer 120.

If the state 204 determines that the trace buffer 116 is full, the method 200 may move to the state 206. The state 206 sets a signal not_ready to a digital one. Then, the state 214 determines if a sticky status bit is set to a value of one. If the sticky status bit is set to a value of one, then the method 200 returns to state 204. If the sticky status bit is equal to a value of zero, the method 200 proceeds to state 216. The state 216 determines whether the application core 118 has stopped. If the application core 118 has not stopped, the method 200 keeps the sticky status bit set to zero. If the state 216 determines the application core 118 has stopped, the state 218 sets the sticky status bit to one.

If the trace buffer 116 is full when the application core 118 attempts to write to the trace buffer 116, the application core 118 receives the not_ready signal until there is at least one entry of free space. The sticky status bit is set if the application core 118 is stopped by the full trace buffer 116 to indicate that the trace was intrusive. Cycle stealing reads may be performed in the read buffer 120.

Figure 3:
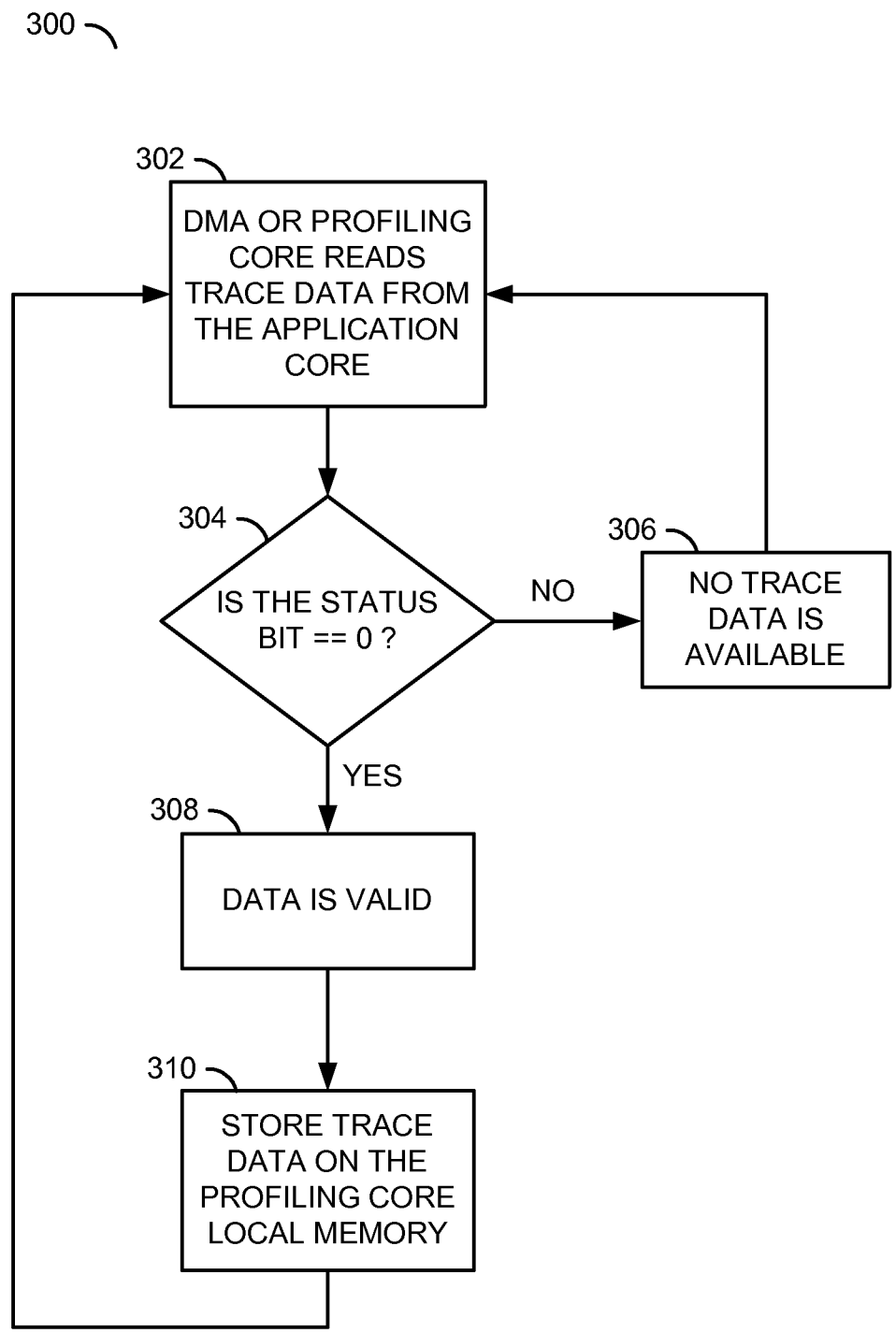
FIG. 3 is a flow chart of the process for storing trace data on the profiling core memory.

Referring to FIG. 3, a flow chart of a method (or process) for storing trace data on the profiling core 112 memory is shown. The method 300 generally comprises a step (or state) 302, a decision step (or state) 304, a step (or state) 306, a step (or state) 308, a step (or state) 310. The state 302 starts the method 300 by having a DMA or profiling core read trace data from the application core 118. Next, the decision state 304 determines if a status bit is equal to zero. If not, the method 300 moves to the state 306. The state 306 indicates that no trace data is available and returns the method 300 to the state 302. If the decision state 304 determines that the status bit is equal to zero, then the method 300 moves to the state 308. The state 308 indicates that data is valid. Next, the state 310 stores trace data on the profiling core local memory. The method then returns to the state 302 and repeats. A DMA controller 108 of the profiling core 112, or the profiling core 112 itself, constantly reads trace data from the application core 118 and moves the valid data to the local memory 110 of the profiling core 112. The trace data read port may be automatically filled with valid trace data upon a cycle stealing basis. The data read by the profiling core 112 may contain a status bit in the most significant bit (MSB). The MSB may represent a valid condition or an error condition. A set MSB (e.g., status bit=1) may indicate an error condition when no trace data is available. A reset MSB (e.g., status bit=0) may indicate valid data.

The profiler software may run on the profiling core 112 and resides completely in core local memory. The profiling core 112 may be implemented within any of the core circuits 104a-104n. The software may maintain specific data necessary for a function such as function start and/or end addresses preloaded by the debugger, cycle counts on the most recent function entries, total cycle counts, and/or total function entry counts.

Every time the trace data indicates a change of instruction flow from a generic function A to a generic function B, the profiler software may increment the total cycle count of function A by the difference of the current cycle count and the most recent entry cycle count of function A. The profiler software may also record the current cycle count as the most recent entry cycle count of function B. If the target address equals the start address of function B, the profiler software may also increment the entry count of function B.

Figure 4:
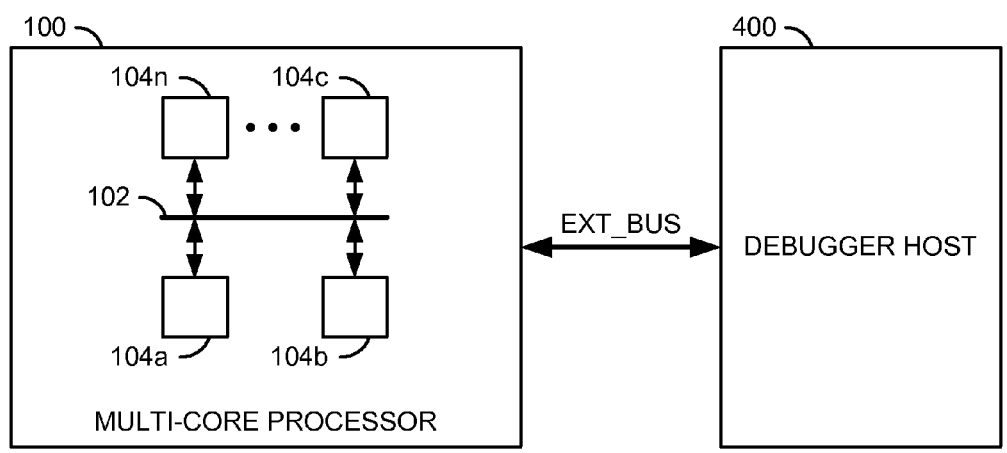
FIG. 4 is a block diagram of data transfer between the multi-core processor and a debugger host.

Referring to FIG. 4, profiler data transfer between the multi-core processor 100 and a debugger host 400 is shown. A signal (e.g., EXT_BUS) may present and/or receive the profiler data to and/or from the multi-core processor 100 and/or the debugger host 400. The signal EXT_BUS may contain final profiler statistics. In one example, the debugger host 400 may reside off-line. The signal EXT_BUS may be transferred via JTAG, a serial interface, Ethernet, or any other means to transfer data. In one example, the debugger host 400 may be used to operate debugging software.

In one implementation, the profiling core 112 may be capable of executing tasks faster than the average change of instruction flow rates of the application program running on the application core 118. This may allow real-time execution needed for certain applications. This may also keep input/output data timing working properly. The higher execution speed of the profiling may also allow additional tests that would not be performed with an external tester.

The functions performed by the diagrams of FIGS. 2 and 3 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products) or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMS (random access memories), EPROMs (electronically programmable ROMs), EEPROMs (electronically erasable ROMs), UVPROM (ultra-violet erasable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, storage and/or playback devices, video recording, storage and/or playback devices, game platforms, peripherals and/or multi-chip modules. Those skilled in the relevant art(s) would understand that the elements of the invention may be implemented in other types of devices to meet the criteria of a particular application.

The various signals of the present invention are generally "on" (e.g., a digital HIGH, or 1) or "off" (e.g., a digital LOW, or 0). However, the particular polarities of the on (e.g., asserted) and off (e.g., de-asserted) states of the signals may be adjusted (e.g., reversed) to meet the design criteria of a particular implementation. Additionally, inverters may be added to change a particular polarity of the signals.

While the invention has been particularly shown and described with reference to the preferred embodiments thereof, it will be understood by those skilled in the art that various changes in form and details may be made without departing from the scope of the invention.

The invention claimed is:

1. A processor implemented method for implementing profiling in a multi-core processor, comprising the steps of:
    (A) configuring a first core of said multi-core processor to (a) communicate through a first input/output port and (b) initiate a testing application;
    (B) configuring a second core of said multi-core processor to (a) communicate through a second input/output port and (b) respond to said testing application;
    (C) configuring a bus matrix connected to said first input/output port and said second input/output port to transfer data between said first core and said second core; and
    (D) generating real-time statistics related to the execution of instructions by said second core, wherein (i) said first core is capable of executing tasks faster than an average change of instruction flow rates of said second core, (ii) said first core further comprises a direct memory access controller configured to read said data from said bus matrix, and (iii) second core further comprises (a) a trace buffer configured to store a stream of recorded events, (b) an on-chip emulator and (c) one or more read buffers configured to perform cycle stealing reads.

2. The method according to claim 1, further comprising the step of:
    configuring a third core configured to respond to said testing application.

3. The method according to claim 2, wherein results of testing of said second core are compared with results of testing said third core.

4. The method according to claim 1, further comprising the step of:
    presenting said real-time statistics to a debugger through an external bus.

5. An apparatus having a processor, said apparatus further comprising:
    means for configuring a first core of said multi-core processor to (a) communicate through a first input/output port and (b) initiate a testing application;
    means for configuring a second core of a multi-core processor configured to (a) communicate through a second input/output port and (b) respond to said testing application; and
    means for configuring a bus matrix connected to said first input/output port and said second input/output port to transfer data between said first core and said second core; and
    means for generating real-time statistics related to the execution of instructions by said second core, wherein (i) said first core is capable of executing tasks faster than an average change of instruction flow rates of said second core, (ii) said first core further comprises a direct memory access controller configured to read said data from said bus matrix, and (iii) second core further comprises (a) a trace buffer configured to store a stream of recorded events, (b) an on-chip emulator and (c) one or more read buffers configured to perform cycle stealing reads.

6. An apparatus comprising:
    a first core of a multi-core processor configured to (a) communicate through a first input/output port and (b) initiate a testing application;
    a second core of said multi-core processor configured to (a) communicate through a second input/output port and (b) respond to said testing application; and a bus matrix connected to said first input/output port and said second input/output port, wherein (i) said bus matrix transfers data between said first core and said second core, (ii) said first core is capable of executing tasks faster than an average change of instruction flow rates of said second core (iii) said testing application generates real-time statistics related to the execution of instructions by said second core, (iv) said first core further comprises a direct memory access controller configured to read said data from said bus matrix, and (v) second core further comprises (a) a trace buffer configured to store a stream of recorded events, (b) an on-chip emulator and (c) one or more read buffers configured to perform cycle stealing reads.

7. The apparatus according to claim 6, further comprising a third core configured to respond to said testing application.

8. The apparatus according to claim 7, wherein results of testing of said second core are compared with results of testing said third core.

9. The apparatus according to claim 6, wherein said real-time statistics are presented to a debugger through an external bus.

10. The apparatus according to claim 6, wherein said first core, said second core and said bus matrix are implemented on a single integrated circuit.

11. The apparatus according to claim 10, wherein said real-time statistics are generated internally on said single integrated circuit.

12. The apparatus according to claim 6, wherein said first core is configured to (i) operate as a profiling core when in a first mode and (ii) operate as an application core when in a second mode.

13. The apparatus according to claim 6, wherein said testing application comprises a profiling software application.

14. The apparatus according to claim 6, wherein said first core further comprises a memory configured to store said data.

15. The apparatus according to claim 6, wherein said first core and said second core are configured to operate in a first mode that allows profiling, and a second mode that allows said first core and said second core to perform non-profiling operations.

16. The apparatus according to claim 6, wherein said testing application is implemented without implementing system stops.

* * * * *